(12) United States Patent
Ohnishi

(10) Patent No.: US 7,577,768 B2
(45) Date of Patent: *Aug. 18, 2009

(54) CONTROL APPARATUS AND METHOD THEREOF

(75) Inventor: Shinji Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/928,137

(22) Filed: Oct. 30, 2007

(65) Prior Publication Data

US 2008/0065791 A1 Mar. 13, 2008

Related U.S. Application Data

(63) Continuation of application No. 10/733,362, filed on Dec. 12, 2003, now Pat. No. 7,305,496.

(30) Foreign Application Priority Data

Dec. 13, 2002 (JP) .............................. 2002-363159

(51) Int. Cl.
　　G06F 13/14　　(2006.01)
　　G06F 13/42　　(2006.01)
　　G06F 11/30　　(2006.01)
　　H04N 5/765　　(2006.01)

(52) U.S. Cl. ..................... 710/15; 710/19; 710/105; 714/48; 714/55

(58) Field of Classification Search ................ None
See application file for complete search history.

(56) References Cited

U.S. PATENT DOCUMENTS

| | | | |
|---|---|---|---|
| 6,052,507 A | 4/2000 | Niida et al. | 386/68 |
| 6,219,736 B1 | 4/2001 | Klingman | 710/129 |
| 6,307,974 B1 | 10/2001 | Tsujimoto | 382/239 |
| 6,311,294 B1 | 10/2001 | Larky et al. | 714/44 |

(Continued)

FOREIGN PATENT DOCUMENTS

JP　　2000-59402　　2/2000

(Continued)

OTHER PUBLICATIONS

Apr. 21, 2008 European Search Report in European Patent Appln. No. 03257835.3.

(Continued)

*Primary Examiner*—Ilwoo Park
(74) *Attorney, Agent, or Firm*—Fitzpatrick, Cella, Harper & Scinto

(57) ABSTRACT

A digital video apparatus connectable to Universal Serial Bus (USB) receives, from a control apparatus, a first request for requesting to change a status of the digital video apparatus to a predetermined status and transmits, to the control apparatus, notification information before a lapse of a predetermined time, the notification information notifying the control apparatus that the status of the digital video apparatus is changed. The digital video apparatus receives, from the control apparatus, a second request for requesting information representative of the status of the digital video apparatus if the notification information cannot be transmitted before the lapse of the predetermined time and transmits, to the control apparatus, information representative of the status of the digital video apparatus in response to the second request.

8 Claims, 4 Drawing Sheets

U.S. PATENT DOCUMENTS

| | | | |
|---|---|---|---|
| 6,717,694 B1 | 4/2004 | Fukunaga et al. | 358/1.16 |
| 6,718,412 B2 | 4/2004 | Purcell et al. | 710/109 |
| 6,721,332 B1 | 4/2004 | McAlear | 370/466 |
| 6,735,658 B1 | 5/2004 | Thornton | 710/305 |
| 7,305,496 B2 | 12/2007 | Ohnishi | 710/15 |
| 2001/0001563 A1 | 5/2001 | Tomaszewski | 348/552 |
| 2002/0078283 A1 | 6/2002 | Purcell et al. | 710/109 |
| 2002/0101515 A1 | 8/2002 | Yoshida et al. | 348/211 |
| 2002/0114004 A1 | 8/2002 | Ferlitsch | 358/1.15 |
| 2003/0133024 A1 | 7/2003 | Ohnishi | 348/231.99 |
| 2004/0101288 A1 | 5/2004 | Ohnishi | 386/124 |

FOREIGN PATENT DOCUMENTS

| | | |
|---|---|---|
| JP | 2001-199132 | 7/2001 |
| JP | 2002-232759 | 8/2002 |
| KR | 2001-0025054 | 3/2001 |
| WO | WO 99/60786 | 11/1999 |
| WO | WO 00/67103 | 11/2000 |

OTHER PUBLICATIONS

Universal Serial Bus Specification, Revision 1.1 (Sep. 23, 1998).
Universal Serial Bus Specification, Revision 2.0 (Apr. 27, 2000).
On-The-Go Supplement to the USB 2.0 Specification, Revision 1.0a (Jun. 24, 2003).
On-The-Go Supplement to the USB 2.0 Specification, Revision 1.0a Jun. 24, 2003.

FIG. 2

| OFFSET | FIELD | SIZE | VALUE | DESCRIPTION |
|---|---|---|---|---|
| 0 | bLength | 1 | 0xXX | SIZE OF THIS DESCRIPTOR, IN BYTES : 13+n |
| 1 | bDescriptorType | 1 | 0x24 | TYPE OF DESCRIPTOR (ASSUMING "CS_INTERFACE" IN THE PRESENT EMBODIMENT) |
| 2 | bDescriptorSubtype | 1 | 0x02 | SUBTYPE OF DESCRIPTOR (ASSUMING "INPUT_TERMINAL" IN THE PRESENT EMBODIMENT) |
| 3 | bTerminalID | 1 | 0x03 | TERMINAL IDENTIFIER |
| 4 | wTerminalType | 2 | 0x0202 | ASSUMING "SEQUENTIAL MEDIA" IN THE PRESENT EMBODIMENT |
| 6 | bAssocTerminal | 1 | 0x00 | UNUSED |
| 7 | iTerminal | 1 | 0xXX | INDEX OF A STRING DESCRIPTOR |
| 8 | wTransportTimeout | 2 | 0xXX | TIMEOUT VALUE THAT HOST SHALL WAIT INTERRUPT PACKET FROM TRANSPORT CONTROL, IN MILLI SECOND (ASSUMING "FIVE SECONDS" IN THE PRESENT EMBODIMENT) |
| 10 | wErrorTimeout | 2 | 0xXX | TIMEOUT VALUE THAT HOST SHALL WAIT INTERRUPT PACKET FROM ERROR CONTROL, IN MILLI SECOND (ASSUMING "ONE SECOND" IN THE PRESENT EMBODIMENT) |
| 12 | bControlSize | 1 | 0xXX | SIZE IN BYTES OF THE bmCONTROLS FIELD : n |
| 13 | bmControls | n | 0xXX | A BITMAP OF SUPPORTED CONTROLS |

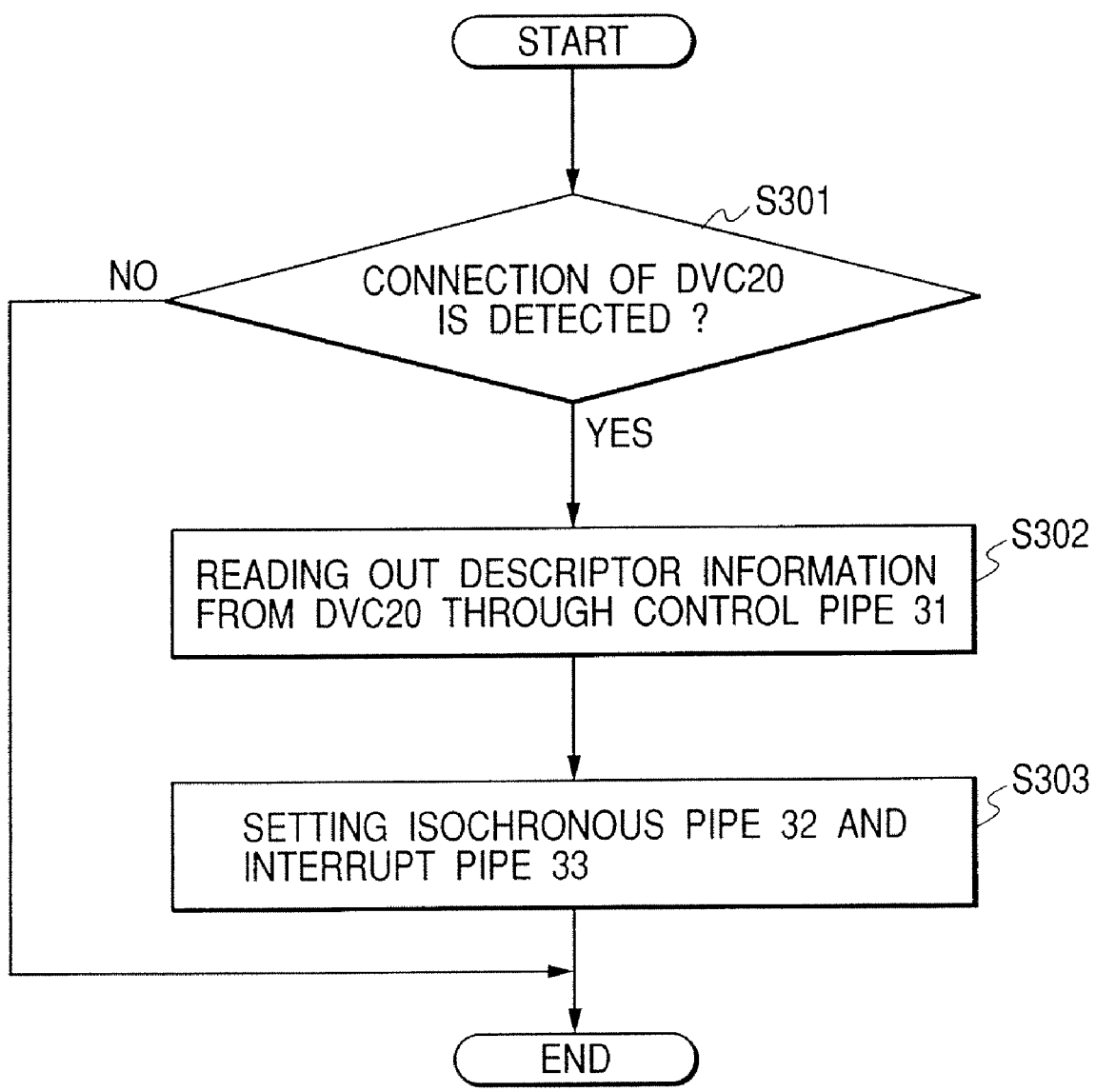

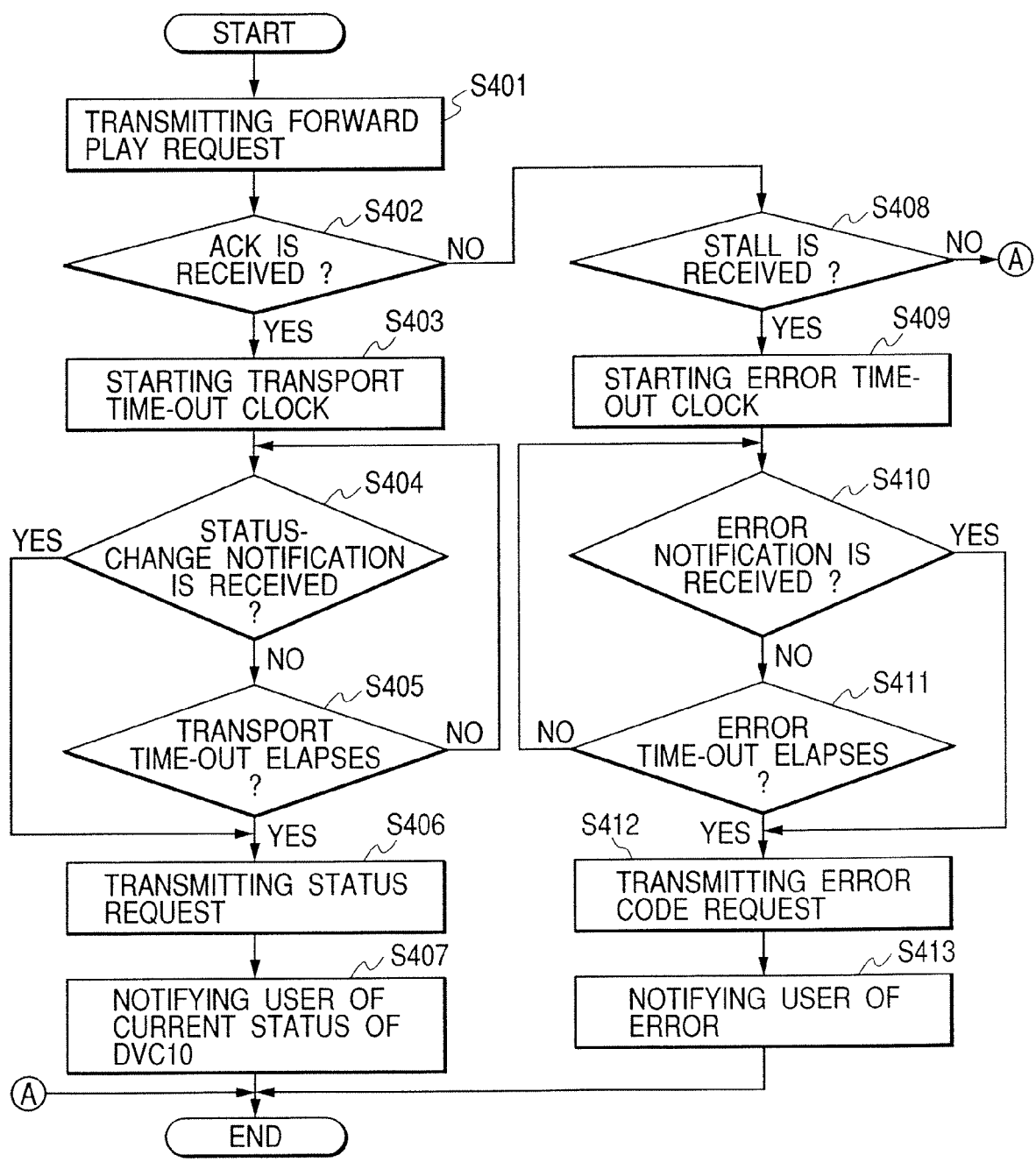

US 7,577,768 B2

CONTROL APPARATUS AND METHOD THEREOF

This application is a continuation of application Ser. No. 10/733,362 filed Dec. 12, 2003.

BACKGROUND OF THE INVENTION

1. Field of the Invention

The present invention relates to a control apparatus and method thereof for controlling a digital video apparatus by using Universal Serial Bus (USB).

2. Related Background Art

One technique for the interconnection between a personal computer and a digital video apparatus (such as a digital video camera) is Universal Serial Bus (USB). It is known that there are USB specifications such as USB1.1 (Universal Serial Bus Specification Revision 1.1, Sep. 23, 1998) and USB2.0 (Universal Serial Bus Specification Revision 2.0, Apr. 27, 2000).

In configuring a control apparatus for controlling a digital video apparatus by utilizing USB, it is necessary to provide a method of reliably notifying a host (such as a personal computer) of whether the status of the video apparatus is to a predetermined status (forward/reverse play, stop, pause, record, record pause, forward/reverse high speed play, forward/reverse slow play, and the like).

It is also necessary to provide a method of reliably notifying a host (such as a personal computer) of the reason why the status of a digital video apparatus is unable to be changed to a predetermined status.

SUMMARY OF THE INVENTION

An object of the present invention is to overcome the above-described drawbacks.

Another object of the present invention is to provide a control apparatus and method thereof capable of reliably knowing whether the status of a digital video apparatus is to a predetermined status.

Still another object of the present invention is to provide a control apparatus and method thereof capable of reliably knowing the reason why the status of a digital video apparatus is unable to be changed to a predetermined status.

According to a preferred embodiment of the present invention, a control apparatus for controlling a digital video apparatus by using Universal Serial Bus (USB), comprises: a storage unit for storing a control program for controlling a first judgment step of judging whether a response to a first request for requesting to change a status of the digital video apparatus to a predetermined status is an ACK or not; a second judgment step of judging, if the response is the ACK, whether notification information notifying to the control apparatus that the status of the digital video apparatus changes before a lapse of a predetermined time is received or not; and a transmission step of transmitting, if the notification information cannot be received before the lapse of the predetermined time, a second request for requesting for information representative of the status of the digital video apparatus to the digital video apparatus; and a control unit for executing the control program.

According to another preferred embodiment of the present invention, a method for a control apparatus for controlling a digital video apparatus by using Universal Serial Bus (USB), comprises: a first judgment step of judging whether a response to a first request for requesting to change a status of the digital video apparatus to a predetermined status is an ACK or not; a second judgment step of judging, if the response is the ACK, whether notification information notifying to the control apparatus that the status of the digital video apparatus changes before a lapse of a predetermined time is received or not; and a transmission step of transmitting, if the notification information cannot be received before the lapse of the predetermined time, a second request for requesting for information representative of the status of the digital video apparatus to the digital video apparatus.

According to a still another preferred embodiment of the present invention, a control apparatus for controlling a digital video apparatus by using Universal Serial Bus (USB), comprises: a storage unit for storing a control program for controlling a first judgment step of judging whether a response to a first request for requesting to change a status of the digital video apparatus to a predetermined status is a STALL or not; a second judgment step of judging, if the response is the STALL, whether notification information notifying to the control apparatus that the status of the digital video apparatus changes before a lapse of a predetermined time is received or not; and a transmission step of transmitting, if the notification information cannot be received before the lapse of the predetermined time, a second request for requesting for information representative of a cause of an error occurred at the digital video apparatus to the digital video apparatus; and a control unit for executing the control program.

According to a still another preferred embodiment of the present invention, a method for a control apparatus for controlling a digital video apparatus by using Universal Serial Bus (USB), comprises: a first judgment step of judging whether a response to a first request for requesting to change a status of the digital video apparatus to a predetermined status is a STALL or not; a second judgment step of judging, if the response is the STALL, whether notification information notifying to the control apparatus that the status of the digital video apparatus changes before a lapse of a predetermined time is received or not; and a transmission step of transmitting, if the notification information cannot be received before the lapse of the predetermined time, a second request for requesting for information representative of a cause of an error occurred at the digital video apparatus to the digital video apparatus.

Still other objects, features and advantages of the present invention will become fully apparent from the following detailed description of the preferred embodiments.

BRIEF DESCRIPTION OF THE DRAWINGS

FIG. 2 is a diagram showing the example of an interface descriptor stored in a memory 206 shown in FIG. 1.

FIG. 3 is a flow chart illustrating an example of a procedure to be executed by a personal computer (PC) 10 after it detects a digital video camera (DVC) 20.

FIG. 4 is a flow chart illustrating an example of a procedure to be executed by PC 10 and DVC 20 when a user supplies a DV control program 107 with a forward play instruction.

DESCRIPTION OF THE PREFERRED EMBODIMENTS

Figure 1:
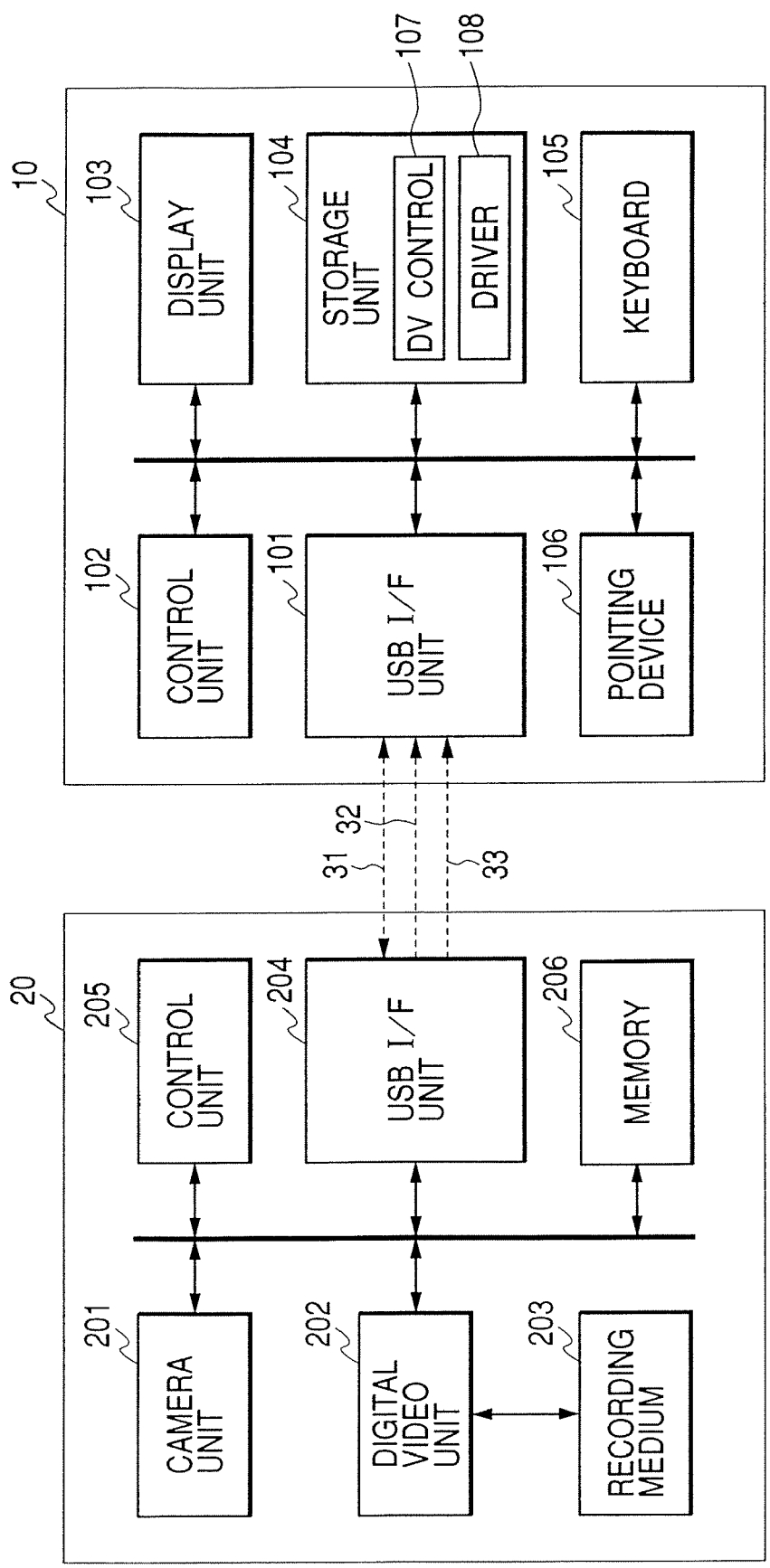
FIG. 1 is a block diagram showing a digital video (DV) control system according to an embodiment.

Embodiments of the invention will be described with reference to the accompanying drawings.

First Embodiment

FIG. 1 is a diagram showing a control system according to the first embodiment. A personal computer (PC) 10 is a control apparatus in the present embodiment. A digital video camera (DVC) 20 is a digital video apparatus in the present embodiment.

PC 10 has a USB interface unit 101, a control unit 102, a display unit 103, a storage unit 104, a keyboard 105 and a pointing device 106. The USB interface unit 101 is in conformity with USB1.1, USB2.0 and the like. The control unit 102 has a central processing unit (CPU) and a memory to control the operation of PC 10. The storage unit 104 is a recording medium such as a hard disk. The pointing device 106 is a mouse, a track pad or the like.

A DV control program 107 and a USB driver 108 are installed in PC 10. The DV control program 107 is application software for controlling DVC 20 via the USB interface 101. The USB driver 108 is software for controlling the communications between PC 10 and DVC 20. PC 10 of present embodiment can control DVC 20 in accordance with the DV control program 107.

DVC 20 has a camera unit 201, a digital video unit 202, a recording medium 203, a USB interface unit 204, a control unit 205 and a memory 206. The camera unit 201 has a function of generating digital video data of an object by using an image sensor or the like. The digital video unit 202 has a function of recording digital video data pick up with the camera unit 201 onto the recording medium 203 and a function of reproducing digital video data recorded on the recording medium 203. The recording medium 203 is a magnetic tape, a magnetic disk, a magneto-optical disk, a semiconductor memory, a hard disk or the like. The USB interface unit 204 is in conformity with USB1.1, USB2.0 or the like, similar to the USB interface unit 101.

The control unit 205 has a microcomputer and a memory to control the operation of DVC 20. The memory 206 stores therein descriptor information describing various information on the performance and function of DVC 20 (the descriptor information including a device descriptor, a configuration descriptor, an interface descriptor and the like).

A control pipe 31 is a first logical connection which is automatically set by the USB driver 108 of PC 10 between a control end point of PC 10 and a control end point of DVC 20. The control pipe 31 is a connection necessary for transferring a request for DVC 20 to DVC 20 by using control transfer of the USB standards. An error code request (a request for an error code representative of the cause of an error occurred at DVC 20), a status request (a request for status information representative of the current status of DVC 20) and the like are also transmitted to DVC 20 via the control pipe 31.

An isochronous pipe 32 is a second logical connection which is automatically set by the USB driver 108 of PC 10 between an isochronous end point of PC 10 and an isochronous end point of DVC 20 in accordance with the descriptor information of DVC 20. The isochronous pipe 32 is a connection necessary for transmitting digital video data reproduced from the recording medium 203 to PC 10 by isochronous transfer of the USB standards. The isochronous transfer is the transfer method which guarantees the transfer of a predetermined amount of data within a predetermined time period.

An interrupt pipe 33 is a third logical connection which is automatically set by the USB driver 108 of PC 10 between an interrupt end point of PC 10 and an interrupt end point of DVC 20 in accordance with the descriptor information of DVC 20. The interrupt pipe 33 is a connection necessary for transmitting a status change notification (information on a current status change of DVC 20 to be notified to PC 10), an error notification (information on an error occurrence at DVC 20 to be notified to PC 10) and the like to PC 10 by interrupt transfer of the USB standards.

FIG. 2 is a diagram showing the example of an interface descriptor stored in the memory 206 shown in FIG. 1. As shown in FIG. 2, the interface descriptor has a bLength field (Offset=0), a bDescriptorType field (Offset=1), a bDescriptorSubtype field (Offset=2), a bTerminalID field (Offset=3), a wTerminalType field (Offset=4), a bAssocTerminal field (Offset=6), an iTerminal field (Offset=7), a wTransportTimeout field (Offset=8), a wErrorTimeout field (Offset=10), a bControlSize field (Offset=12) and a bmControls field (Offset=13). The contents of each field are described in FIG. 2.

The wTransportTimeout field and wErrorTimeout field are important fields so that the detailed description thereof will be given. In the wTransportTimeout field, a value called a transport time-out is described. The transport time-out is the standby time until the DV control program 107 receives the status change notification. If the DV control program 107 cannot receive the status change notification from DVC 20 before the lapse of the transport time-out, the DV control program 107 automatically transmits a status request to DVC 20. Therefore, even if the status change notification cannot be received from DVC 20 for any reason, the DV control program 107 can know the current status of DVC 20 at the optimum timing. In the present embodiment, the transport time-out is assumed to be five seconds.

In the wErrorTimeout field, a value called an error time-out is described. The error time-out is the standby time until the DV control program 107 receives the error notification. If the DV control program 107 cannot receive the error notification from DVC 20 before the lapse of the error time-out, the DV control program 107 automatically transmits an error code request to DVC 20. Therefore, even if the error notification cannot be received from DVC 20 for any reason, the DV control program 107 can know the cause of an error occurred at DVC 20 at the optimum timing. In the present embodiment, the error time-out is assumed to be one second.

FIG. 3 is a flow chart illustrating an example of the procedure to be executed after PC 10 detects a connection of DVC 20.

Step S301: The USB driver 108 judges whether or not a connection (electric connection) of DVC 20 is detected. If a connection of DVC 20 is detected, the flow advances to Step S302.

Step S302: The USB driver 108 automatically reads out the descriptor information of DVC 20 from DVC 20 via the control pipe 31 and stores the read-out descriptor information in the storage unit 104.

Step S303: The USB driver 108 automatically sets the isochronous pipe 32 between an isochronous end point of PC 10 and an isochronous end point of DVC 20, and the interrupt pipe 33 between an interrupt end point of PC 10 and an interrupt end point of DVC 20, in accordance with the descriptor information of DVC 20.

With this procedure, it is possible for PC 10 of the present embodiment to automatically read out the descriptor information of DVC 20 from DVC 20 and automatically set the logical connections between PC 10 and DVC 20.

FIG. 4 is a flow chart illustrating an example of the procedure to be executed by PC 10 and DVC 20 when a user supplies the DV control program 107 with a forward play instruction.

Step S401: In accordance with a user instruction, the DV control program 107 supplies the USB interface unit 101 with a forward play request (a request for changing the current status of DVC 20 to a play state and transmitting digital video data reproduced from the recording medium 203 to PC 10 via the isochronous pipe 32). The USB interface unit 101 transmits the forward play request to DVC 20 via the control pipe 31.

The USB interface unit 204 receives the forward play request from PC 10 via the control pipe 31 and supplies the received forward play request to the control unit 205. In accordance with the forward play request, the control unit 205 judges whether the status of DVC 20 can be changed to the play state. If the status can be changed to the play state (or if the status is already in the play state), the control unit 205 supplies the USB interface unit 204 with an ACK, whereas if the status of DVC 20 cannot be changed to the play state, the control unit 205 supplies the USB interface unit 204 with a STALL. The USB interface 204 transmits the ACK or STALL to PC 10 via the control pipe 31.

Step S402: The DV control program 107 judges whether the USB interface unit 101 receives the ACK via the control pipe 31. If the USB interface unit 204 receives the ACK, the flow advances to Step S403, whereas if the USB interface unit 204 cannot receive the ACK, the flow advances to Step S408.

Step S403: The DV control program 107 starts counting the transport time-out (in present embodiment, the transport time-out is assumed to be five seconds). The transport time-out can be acquired from the above-described wTransportTimeout field.

Step S404: The DV control program 107 judges whether the USB interface unit 101 receives the status change notification (information on a current status change of DVC 20 to be notified to PC 10) via the interrupt pipe 33. If the USB interface unit 101 receives the status change notification, the flow advances to Step S406, whereas if the USB interface unit 101 cannot receive the status change notification for any reason, the flow advances to Step S405.

Step S405: The DV control program 107 judges whether the transport time-out elapses. If the transport time-out elapses, the flow advances to Step S406, whereas if the transport time-out does not elapse, the flow returns to Step S404.

Step S406: If the status change notification is received before the lapse of the transport time-out or if the status change notification cannot be received before the lapse of the transport time-out, the DV control program 107 supplies the USB interface unit 101 with a status request (a request for the status information representative of the current status of DVC 20). The USB interface unit 101 transmits the status request to DVC 20 via the control pipe 31.

The USB interface unit 204 receives the status request from PC 10 via the control pipe 31 and supplies the received status request to the control unit 205. The control unit 205 supplies the status information to the USB interface unit 204. The USB interface unit 204 transmits the status information to PC 10 via the control pipe 31.

Step S407: The DV control program 107 analyzes the status information supplied from DVC 20 to judge the current status of DVC 20. In order to notify the user of the current status of DVC 20, the DV control program 107 displays the information (constituted of icons, characters or the like) representative of the current status of DVC 20 on the display unit 103.

Step S408: The DV control program 107 judges whether the USB interface unit 101 receives the STALL from DVC 20 via the control pipe 31. If the USB interface unit 204 receives the STALL, the flow advances to Step S409.

Step S409: The DV control program 107 starts counting the error time-out (in present embodiment, the error time-out is assumed to be one second). The error time-out can be acquired from the above-described wErrorTimeout field.

Step S410: The DV control program 107 judges whether the USB interface unit 101 receives the error notification (information on an error occurrence at DVC 20 to be notified to PC 10) via the interrupt pipe 33. If the USB interface unit 101 receives the error notification, the flow advances to Step S412, whereas if the USB interface unit 101 cannot receive the error notification for any reason, the flow advances to Step S411.

Step S411: The DV control program 107 judges whether the error time-out elapses. If the error time-out elapses, the flow advances to Step S412, whereas if the error time-out does not elapse, the flow returns to Step S410.

Step S412: If the error notification is received before the lapse of the error time-out or if the error notification is not received before the lapse of the error time-out, the DV control program 107 supplies the USB interface unit 101 with an error code request (a request for an error code representative of the cause of an error occurred at DVC 20). The USB interface unit 101 transmits the error code request to DVC 20 via the control pipe 31.

The USB interface unit 204 receives the error code request from PC 10 via the control pipe 31 and supplies the received error code to the control unit 205. The control unit 205 supplies the USB interface unit 204 with an error code. The USB interface unit 204 transmits the error code to PC 10 via the control pipe 31.

Step S413: The DV control program 107 analyzes the error code supplied from DVC 20 to identify the cause of the error. In order to notify the user of the error cause, the DV control program 107 displays the information representative of the error cause on the display unit 103.

In the flow chart shown in FIG. 4, description is made on the transmission of a request for changing the status of DVC 20 to the forward play state. A request for changing the status of DVC 20 to the reverse play, stop, pause, record, record pause, forward high speed play, reverse high speed play, forward slow play, reverse slow play or the like may also be made in a manner similar to that illustrated in the procedure of FIG. 4. The description of such a case is therefore omitted.

As described above, according to the DV control program 107 of present embodiment, even if the status change notification cannot be received before the lapse of the transport time-out, the status request can be transmitted to DVC 20 so that it is possible to reliably know whether the status of a digital video apparatus changes to the predetermined status.

According to the DV control program 107 of the present embodiment, even if the error notification cannot be received from DVC 20 before the lapse of the error time-out, the error request can be transmitted to DVC 20 so that it is possible to reliably notify the reason why the status of the digital video apparatus is unable to be changed to a predetermined status.

According to DVC 20 of the present embodiment, the status time-out can be notified to the DV control program 107 by using the interface descriptor. Therefore, even if the status change notification cannot be transmitted to PC 10 for any reason, the status request can be transmitted to the DV control program 107 at the optimum timing. Accordingly, the DV control program 107 can notify the user of the current status of DVC 20.

According to DVC 20 of the present embodiment, the error time-out can be notified to the DV control program 107 by using the interface descriptor. Therefore, even if the error notification cannot be transmitted to PC 10 for any reason, the error request can be transmitted to the DV control program 107 at the optimum timing. Accordingly, the DV control program 107 can notify the user of the cause of an error that occurred at DVC 20.

Other Embodiments

The scope of the invention contains also the case wherein software program codes realizing the function of the embodiment described above are supplied to a computer (CPU or MPU) of an apparatus or system connected to various devices realizing the embodiment function, and the computer operates the devices in accordance with the stored programs.

In this case, the software program codes themselves realize the embodiment function. Therefore, the program codes themselves constitute the present invention. Transmission media for such program codes may be communication media (wired channels such as optical fibers, radio channels and the like) of a computer network (LAN, WAN such as the Internet, radio communication network or the like) system for supplying program information as carriers of transmission waves.

Means for supplying a computer with such program codes, e.g., a storage medium storing the program codes, constitute the present invention. The storage medium for storing such program codes may be a flexible disk, a hard disk, an optical disk, a magneto-optical disk, a CD-ROM, a magnetic tape, a nonvolatile memory card, a ROM or the like.

It is obvious that the program codes are included as the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of the embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The above-described preferred embodiments are merely exemplary of the present invention, and are not to be construed to limit the scope of the present invention.

For example, the present invention is also applicable to a system utilizing extended specifications (inclusive of specifications to be prescribed in the future) of USB1.1 or USB2.0.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A digital video apparatus connectable to Universal Serial Bus (USB), the digital video apparatus comprising:
    a receiving unit that receives, from a control apparatus, a first request for requesting to change a status of the digital video apparatus to a predetermined status; and
    a transmitting unit that transmits, to the control apparatus, notification information before a lapse of a predetermined time, the notification information notifying the control apparatus that the status of the digital video apparatus is changed,
    wherein the receiving unit receives, from the control apparatus, a second request for requesting information representative of the status of the digital video apparatus if the notification information cannot be transmitted before the lapse of the predetermined time, and
    wherein the transmitting unit transmits, to the control apparatus, information representative of the status of the digital video apparatus in response to the second request.

2. The digital video apparatus according to claim 1, wherein the receiving unit receives the first and second requests from the control apparatus via a control pipe in conformity with USB.

3. The digital video apparatus according to claim 1, wherein the transmitting unit transmits the notification information via an interrupt pipe in conformity with USB.

4. The digital video apparatus according to claim 1, further comprising:
    a memory that stores descriptor information including the predetermined time.

5. A digital video apparatus connectable to Universal Serial Bus (USB), the digital video apparatus comprising:
    a receiving unit that receives, from a control apparatus, a first request for requesting to change a status of the digital video apparatus to a predetermined status; and
    a transmitting unit that transmits, to the control apparatus, notification information before a lapse of a predetermined time, the notification information notifying the control apparatus that the status of the digital video apparatus is changed,
    wherein the receiving unit receives, from the control apparatus, a second request for requesting information representative of a cause of an error that occurred at the digital video apparatus if the notification information cannot be transmitted before the lapse of the predetermined time, and
    wherein the transmitting unit transmits, to the control apparatus, information representative of a cause of an error occurred at the digital video apparatus in response to the second request.

6. The digital video apparatus according to claim 5, wherein the receiving unit receives the first and second requests from the control apparatus via a control pipe in conformity with USB.

7. The digital video apparatus according to claim 5, wherein the transmitting unit transmits the notification information via an interrupt pipe in conformity with USB.

8. The digital video apparatus according to claim 5, further comprising:
    a memory that stores descriptor information including the predetermined time.

* * * * *